No. 867,399. PATENTED OCT. 1, 1907.
M. J. McGILL.
PLUG VALVE.
APPLICATION FILED FEB. 27, 1907.
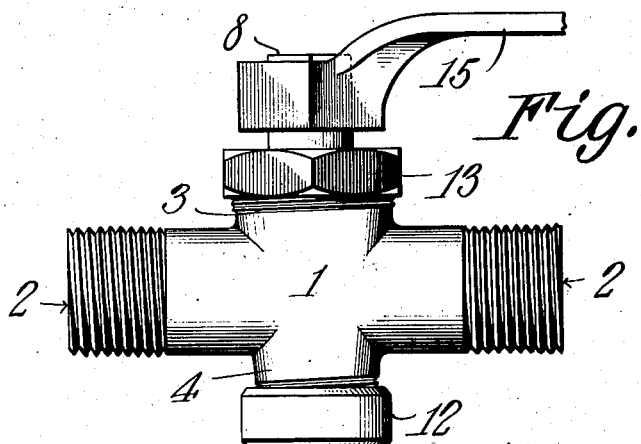
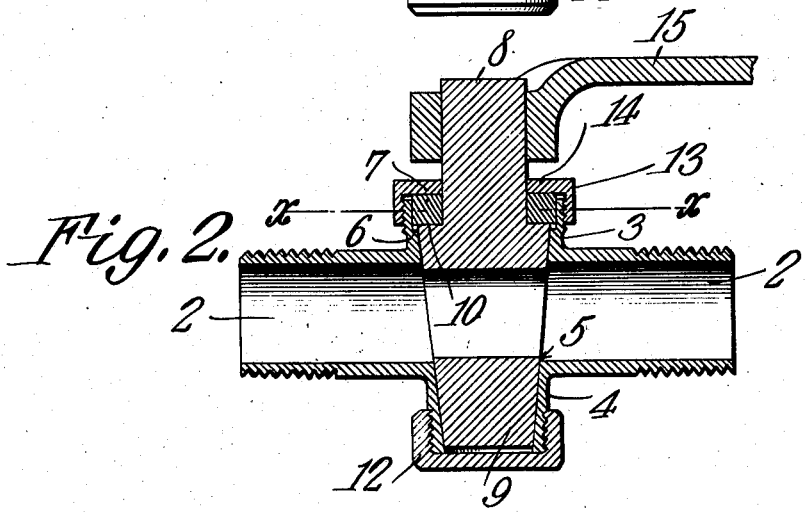
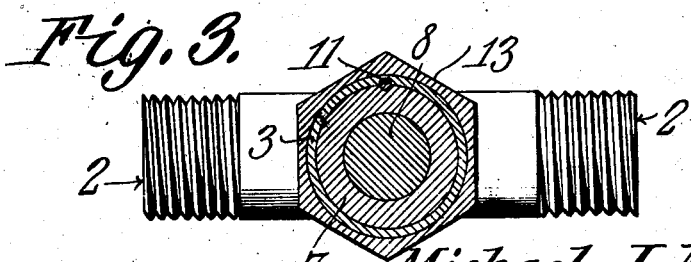
Michael J. McGill,
INVENTOR.
By C. A. Snow & Co.
ATTORNEYS
WITNESSES:
E. F. Stewart
Herbert D. Lawson

UNITED STATES PATENT OFFICE.

MICHAEL J. McGILL, OF PARK CITY, UTAH.

PLUG-VALVE.

No. 867,399.   Specification of Letters Patent.   Patented Oct. 1, 1907.

Application filed February 27, 1907. Serial No. 359,602.

*To all whom it may concern:*

Be it known that I, MICHAEL J. MCGILL, a citizen of the United States, residing at Park City, in the county of Summit and State of Utah, have invented a new and useful Plug-Valve, of which the following is a specification.

This invention relates to plug valves and is particularly designed for air drill throttles and wherever it is desired to use a valve which is subjected to high pressure.

The object of the invention is to provide a simple form of valve which is dust and leak proof and which can be readily repaired in the event of wear.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a side elevation of the valve; Fig. 2 is a longitudinal section therethrough; and Fig. 3 is a section on line $x$—$x$, Fig. 2.

Referring to the figures by characters of reference, 1 is a valve casing having oppositely extending branches 2. The upper end 3 of the casing is screw-threaded as shown and the lower end 4 of said casing is also screw threaded. The casing has a tapered valve seat 5 therein, said seat being gradually reduced in diameter toward the lower end of the casing. The upper or large end of the seat is counterbored as shown at 6, and this countersunk portion is designed to receive a ring 7 disposed to surround the stem 8 of a tapered plug valve 9. An annular shoulder 10 is formed by the valve at the base of the stem 8 and constitutes an abutment for the ring 7. This ring is held against rotation within the casing by means of a key 11. A bottom cap 12 surrounds the lower end of the casing and engages the threaded portion thereof and this cap is designed to close said end of the casing and prevent leakage or the admission of dust. The upper threaded portion of the casing is engaged by a nut 13 having an inwardly extending flange 14 which laps the ring 7 and bears thereagainst and is designed when the nut is screwed on to the top portion 3 to force the ring into the counterbored portion 6 and against the shoulder 10 so as to hold the valve tightly upon its seat. A suitable handle 15 may be connected to the stem 8 in any desired manner whereby the valve can be readily turned upon its seat.

The valve herein described is, as before stated, particularly designed for controlling air under pressure and by reason of its peculiar construction it becomes impossible for the stem to be blown out of its seat and leakage and the admission of dust is absolutely prevented. As the seat and the valve wear the valve can be adjusted longitudinally simply by tightening the nut 13 and should the seat get out of true it is merely necessary to remove the valve and the cap 12 whereupon a taper reamer can be inserted into the casing and the seat readily dressed. It is to be understood that this valve or plug cock may be used for steam or water as well as air. It may also be used as a cylinder cock and in fact wherever efficiency and durability are desirable.

What is claimed is:

A valve comprising a casing having a tapered seat extending therethrough, the large end of the seat being counterbored, both ends of said seat being open, a screw cap surrounding and engaging the small end of the seat and constituting a closure therefor, a tapered plug valve bearing upon the seat and having a stem at the large end thereof, there being an annular shoulder surrounding the stem, a ring bearing upon the shoulder and disposed within the counterbored portion of the seat, a key engaging said ring and the counterbored portion to prevent rotation of the ring, and a nut surrounding and detachably engaging the large end of the seat and disposed to bear upon the ring and force it against the shoulder.

In testimony that I claim the foregoing as my own, I have hereto affixed my signature in the presence of two witnesses.

MICHAEL J. McGILL.

Witnesses:
HENRY FARES,
J. P. LANGFORD.